Patented Nov. 4, 1952

2,616,870

UNITED STATES PATENT OFFICE 2,616,870

POLYVINYL ACETAL RESIN COMPOSITION

Maxwell A. Pollack, Lake Arrowhead, N. J.

No Drawing. Application June 3, 1950,
Serial No 166,067

5 Claims. (Cl. 260—31.2)

1

This application relates to a plastic composition and particularly to a plasticized vinyl acetal plastic.

This application is a continuation-in-part of my application Serial No. 8,282 filed February 13, 1948 for Plastic Compositions. In that application I have described aryl esters of higher aliphatic acids such as phenyl oleate for use in polyvinyl chloride resins. I find advantages in the use of plasticizers of the kind described in the said copending application with the polyvinyl acetal resins, in making plastics suitable for use as the laminating agent in safety glass manufacture.

The plastic which is conventionally used in making safety glass is chiefly polyvinyl butyral. This polyvinyl butyral is ordinarily plasticized with dibutyl sebacate, triethyleneglycol dihexoate, dibutyl cellosolve adipate, or the like.

My new plasticizer, which consists very largely of a higher fatty acid, is much less expensive per pound than the plasticizers referred to above. In addition, my plasticizer lengthens the range of temperature in which the plasticized polyvinyl butyral is of the proper consistency for use as the laminating plastic in safety glass.

There has been heretofore the problem of making a plastic which would be neither too soft at elevated temperatures to which a windshield, for example, may be exposed, nor so rigid or hard as to permit delamination of the safety glass when subjected to sharp impact at the lowest winter temperatures. I consider that the explanation of the wide range of temperatures, under which the polyvinyl acetal plastics containing my new plasticizer are satisfactory, is due in part to secondary valence forces and the long chain structure of the plasticizer, favoring flexibility, in conjunction with the aryl group which promotes compatibility between the plasticizer and the polyvinyl acetal resin.

Briefly stated, my invention comprises a polyvinyl acetal resin and a plasticizer mixed therewith, the plasticizer being an aryl ester of a higher fatty acid.

The resin to be used with my plasticizer is preferably the commercial polyvinyl butyral resin. Alternative resins that may be substituted for the polyvinyl butyral, on an equal weight basis, are those made in similar manner to the polyvinyl butyral but with a different aldehyde substituted for butyl aldehyde on an equivalent weight basis.

Examples of the other aldehydes that may be used in making polyvinyl acetals for the present purposes are formaldehyde, acetaldehyde, propionaldehyde, and glyoxal.

2

The polyvinyl acetal to be used is either one available commercially or made by the conventional process, such as partial hydrolysis of polyvinyl acetate, formate, or propionate, and combination of the hydrolysis product, namely, the polyvinyl alcohol with the selected aldehyde. There is no advantage in using the formate, propionate, and chloracetate over the polyvinyl acetate as the raw material to be hydrolyzed to supply the polyvinyl alcohol to combine with the selected aldehyde. For that reason the polyvinyl acetate is preferred as the raw material.

Examples of the plasticizer that may be used are esters of a monohydric phenol with monocarboxylic higher fatty acids containing at least 16 carbon atoms to the molecule and of monocarboxylic cycloaliphatic acids. Examples of such esters are phenyl oleate, phenyl abietate, phenyl esters of the acids of tall oil and the corresponding unsaturated acid esters of alkyl phenols such as m- and p-cresol and tertiarybutyl phenol. Such alkyl phenols may be generally classed as alkyl phenols containing not more than 4 carbon atoms in the alkyl group.

As to proportions, the plasticizer is used in amount varying with the extent of plasticization desired, as in the ratio of 5 to 100 parts by weight for 100 of polyvinyl butyral or like polyvinyl acetal resin. For most commercial purposes, I use 25 to 75 parts of the plasticizer, to produce a finished product that is of proper consistency over the range of temperatures to which it is exposed during outdoor use.

The invention will be further illustrated by description in connection with the following specific examples of the practice of it.

*Example 1*

The resin used was typical of a class which had found wide service in the production of plastic interlayers for safety glass, and consisted essentially of a thermoplastic material which may be described as polyvinyl butyral such as might be produced for example by the partial hydrolysis of polyvinyl acetate and subsequent condensation of from 2 to 8 mols of this with 1 mol of normal butyraldehyde. 100 parts of this resin, polyvinyl butyral, was blended thoroughly with 45 parts of phenyl oleate and extruded in the form of a thin sheet .025 inch in thickness. This was made up into a laminated composition by applying the resin sheet between two clean pieces of plate glass and the whole pressed lightly first for the removal of air and the creation of a temporary bond and finally cemented under a pressure of 150 pounds per square inch at 225° F. under liquid pressure in an autoclave for thirty minutes. The composition was cooled under pressure, removed and washed. The resulting safety glass composition showed extremely high resistance to shattering both at 0° F. and 120° F.

*Example 2*

The procedure of Example 1 was followed using p-cresyl oleate instead of phenyl oleate and the product was eminently suited for use as a glazing material in automobiles.

*Example 3*

The procedure of Example 1 is followed except that each of the plasticizers listed above, with the exception of phenyl oleate and p-cresyl oleate, was substituted in turn for the phenyl oleate of Example 1 on an equal weight basis. The plastics made were suitable for use as the laminating material in the manufacture of safety glass.

*Example 4*

The precedure of Examples 1, 2 and 3 above were followed except that the polyvinyl butyral resin was substituted on a pound for pound basis by each of the other polyvinyl resins listed above, with the production of plastics of good properties and proper consistency for use as a safety glass laminating material over a wide range of temperatures.

With the different polyvinyl acetal resins the proportion of the plasticizer used was varied within the range of 25 parts to 75 parts for 100 parts of the polyvinyl acetal resin. Within this range the proportion of plasticizer is made larger the smaller the number of carbon atoms in the aldehyde which is reacted with the polyvinyl alcohol.

*Example 5*

Ten parts of the polyvinyl butyral resin were dissolved in 90 parts by weight of a 9:1 blend of ethyl alcohol to ethyl lactate. To 100 parts of this solution there were added 4 parts of parachloro phenyl oleate. This produced a clear solution. The solution was poured on amalgamated tin plates and the solvent allowed to evaporate. The resulting dry film was placed between glass plates and consolidating pressure was applied. The assembly was then heated in an oven for one hour at 85° C. and then cooled to room temperature before the pressure was released. The resulting sandwich or safety glass showed great resistance to shattering over a wide range of temperatures.

The aryl esters described herein may be blended with each other or with other plasticizers that are soluble in the aryl esters, for use as a plasticizer mixture. Thus phenyl oleate may be mixed with dibutyl sebacate, dibutyl phthalate, dioctyl phthalate and dibutoxyethyl adipate. Suitable proportions are 25 to 75 parts of any one of the plasticizers to 100 parts of the total weight of plasticizer mixture.

For convenience in identification, the polyvinyl acetals made with the aldehydes listed above are named, in order, polyvinyl formal, polyvinyl acetal, and polyvinyl propional. They and also the polyvinyl butyral may be used alone or mixed with each other along with my improved plasticizer.

It will be understood also that it is intended to cover all changes and modifications of the examples of the invention herein chosen for the purpose of illustration which do not constitute departures from the spirit and scope of the invention.

What I claim is:

1. A plastic composition comprising a polyvinyl acetal resin and phenyl oleate, the phenyl oleate serving as plasticizer for the resin.

2. A plastic composition comprising a polyvinyl acetal resin and the phenyl ester of an unsaturated fatty acid containing at least 16 carbon atoms to the molecule, the ester serving as plasticizer for the resin and the proportion of the ester being 25 to 75 parts by weight for 100 parts of the resin.

3. A plastic composition characterized by consistency suitable for the plastic laminating material of safety glass over a wide range of outdoor temperatures, the composition comprising a polyvinyl acetal resin and an ester of an unsaturated fatty acid containing at least 16 carbon atoms to the molecule with a phenol selected from the group consisting of phenol and alkyl phenols having not more than 4 carbon atoms in the alkyl group, the ester serving as plasticizer for the resin.

4. A plastic composition comprising polyvinyl butyral resin and an ester of an unsaturated fatty acid containing at least 16 carbon atoms to the molecule with a phenol selected from the group consisting of phenol and alkyl phenols having not more than 4 carbon atoms in the alkyl group, the ester serving as plasticizer for the said resin.

5. A plastic composition comprising polyvinyl butyral resin and an ester of an unsaturated fatty acid containing at least 16 carbon atoms to the molecule with a phenol selected from the group consisting of phenol and alkyl phenols having not more than 4 carbon atoms in the alkyl group, the ester serving as plasticizer for the resin and the proportion of the ester being 25 to 75 parts by weight for 100 parts of the resin.

MAXWELL A. POLLACK.

REFERENCES CITED

The following references are of record in the file of this patent:

UNITED STATES PATENTS

| Number | Name | Date |
|---|---|---|
| 2,132,160 | Hagedorn | Oct. 4, 1938 |
| 2,198,970 | Muller | Apr. 30, 1940 |
| 2,345,006 | Ross et al. | Mar. 28, 1944 |

FOREIGN PATENTS

| Number | Country | Date |
|---|---|---|
| 513,296 | Great Britain | Oct. 9, 1939 |